(12) United States Patent
Kudoh

(10) Patent No.: US 9,279,954 B2
(45) Date of Patent: Mar. 8, 2016

(54) LENS BARREL CAPABLE OF INCREASING SHOOTING MAGNIFICATION WHILE BEING MINIATURIZED, AND IMAGE PICKUP APPARATUS

(71) Applicant: CANON KABUSHIKI KAISHA, Tokyo (JP)

(72) Inventor: Tomoyuki Kudoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 13/929,042

(22) Filed: Jun. 27, 2013

(65) Prior Publication Data

US 2014/0133037 A1 May 15, 2014

(30) Foreign Application Priority Data

Jul. 4, 2012 (JP) ................................. 2012-150294

(51) Int. Cl.
*G02B 7/10* (2006.01)
*G02B 7/09* (2006.01)
*G02B 7/04* (2006.01)

(52) U.S. Cl.
CPC ........ *G02B 7/102* (2013.01); *G02B 7/04* (2013.01); *G02B 7/10* (2013.01)

(58) Field of Classification Search
CPC . G02B 7/04; G02B 7/10; G02B 7/021–7/023; G03B 17/04
USPC .................................. 359/699–704, 822–826
See application file for complete search history.

(56) References Cited

U.S. PATENT DOCUMENTS

| | | | |
|---|---|---|---|
| 2007/0019948 A1* | 1/2007 | Terada | 396/349 |
| 2011/0032626 A1* | 2/2011 | Tsuji | 359/699 |
| 2011/0038058 A1* | 2/2011 | Fukai | 359/700 |
| 2013/0242410 A1* | 9/2013 | Hsueh et al. | 359/700 |

FOREIGN PATENT DOCUMENTS

| | | |
|---|---|---|
| JP | 2001-228384 A | 8/2001 |
| JP | 2010-156870 A | 7/2010 |

* cited by examiner

*Primary Examiner* — Thomas K Pham
*Assistant Examiner* — Marin Pichler
(74) *Attorney, Agent, or Firm* — Cowan, Liebowitz & Latman, P.C.

(57) ABSTRACT

Lens barrel capable of increasing shooting magnification while being miniaturized. A first lens group is caused to move in a direction of an optical axis by rotation of a second cam ring following rotation of a drive ring which has a focus cam groove on an inner periphery and is disposed on an outer periphery of a fixed cam ring having a cam groove and a rectilinear groove on an inner periphery. A second cam groove is disposed behind the first lens group in the direction of the optical axis. Rotation of the drive ring causes a follower of a focus group holding unit, which holds the second lens group, to follow the focus cam groove while being guided to move rectilinearly by the rectilinear groove. The follower following the focus cam groove causes the focus group holding unit to move in the direction of the optical axis.

4 Claims, 8 Drawing Sheets

LENS BARREL CAPABLE OF INCREASING SHOOTING MAGNIFICATION WHILE BEING MINIATURIZED, AND IMAGE PICKUP APPARATUS

BACKGROUND OF THE INVENTION

1. Field of the Invention

The present invention relates to an image pickup apparatus such as a digital camera, and in particular to a structure of a lens barrel which the image pickup apparatus has.

2. Description of the Related Art

Digital cameras that are exemplary image pickup apparatuses storing images, which are obtained using an image pickup device such as a CCD or a CMOS, in a semiconductor memory or the like are becoming popular. In such digital cameras, the shooting angle of view is varied (so-called zooming operation) by changing the intervals between a plurality of lens groups.

In recent years, there has been an increasing demand for increasing zooming magnification while making a body (camera main body) thinner. Accordingly, a structure that enables miniaturization of a body while securing the longest possible movement strokes of lens groups is desired.

Therefore, in a so-called retractable zoom lens barrel, it is necessary to form cam grooves in cam cylinders in a manner extending in a direction of an optical axis so as to secure long movement strokes of lens groups. For example, there has been proposed an arrangement in which a cam groove is formed over the entire width of one extended cam cylinder in the direction of an optical axis so as to secure a long movement stroke of a lens group inside, and a cam groove is also provided outside the cam cylinder to hold a lens group and move the lens group in the direction of the optical axis (see Japanese Laid-Open Patent Publication (Kokai) No. 2010-156870). Also, there has been proposed an arrangement in which a cam groove is formed in a fixed cam cylinder, which is never extended, over the entire width thereof in a direction of an optical axis so as to secure a long movement stroke of a lens group inside (see Japanese Laid-Open Patent Publication (Kokai) No. 2001-228384).

However, according to the techniques described in Japanese Laid-Open Patent Publication (Kokai) No. 2010-156870 and Japanese Laid-Open Patent Publication (Kokai) No. 2001-228384, the number of optical systems such as lens groups that can be placed inside a cam cylinder is limited, and it is necessary to arrange the optical systems with consideration given to the balance between cam groove stroke and rotation phase. In this case, if the length of a cam cylinder in a direction of an optical axis is required to be long so as to form such a cam groove as to obtain a desired stroke, this will bring about upsizing of a lens barrel.

SUMMARY OF THE INVENTION

The present invention provides a lens barrel capable of increasing shooting magnification while being miniaturized, and an image pickup apparatus having the lens barrel.

Accordingly, a first aspect of the present invention provides a lens barrel comprising a first cam ring configured to have a first cam groove and a rectilinear groove formed on an inner periphery, a drive ring configured to have a second cam groove on an inner periphery and be disposed on an outer periphery of the first cam ring, a second cam ring configured to be disposed on the inner periphery of the first cam ring and caused to follow the first cam groove and move in a direction of an optical axis by rotation of the drive ring, a first lens group configured to be caused to move in the direction of the optical axis by rotation of the second cam ring following rotation of the drive ring, a second lens group configured to be disposed on an image surface side of the first lens group, and a holding unit configured to have a follower, which is to engage with the second cam groove, and hold the second lens group, wherein rotation of the drive ring causes the follower to follow the second cam groove while being guided to move rectilinearly by the rectilinear groove in the direction of the optical axis, and the follower following the second cam groove causes the holding unit to move in the direction of the optical axis.

Accordingly, a second aspect of the present invention provides an image pickup apparatus comprising an image pickup device, and a lens barrel comprising a first cam ring that has a first cam groove and a rectilinear groove formed on an inner periphery, a drive ring that has a second cam groove on an inner periphery and is disposed on an outer periphery of the first cam ring, a second cam ring that is disposed on the inner periphery of the first cam ring and is caused to follow the first cam groove and move in a direction of an optical axis by rotation of the drive ring, a first lens group that is caused to move in the direction of the optical axis by rotation of the second cam ring following rotation of the drive ring, a second lens group that is disposed on an image surface side of the first lens group, and a holding unit that has a follower, which is to engage with the second cam groove, and holds the second lens group, wherein rotation of the drive ring causes the follower to follow the second cam groove while being guided to move rectilinearly by the rectilinear groove in the direction of the optical axis, and the follower following the second cam groove causes the holding unit to move in the direction of the optical axis.

According to the present invention, the lens barrel capable of increasing shooting magnification while being miniaturized can be realized.

Further features of the present invention will become apparent from the following description of exemplary embodiments (with reference to the attached drawings).

DESCRIPTION OF THE EMBODIMENTS

Figure 1A:
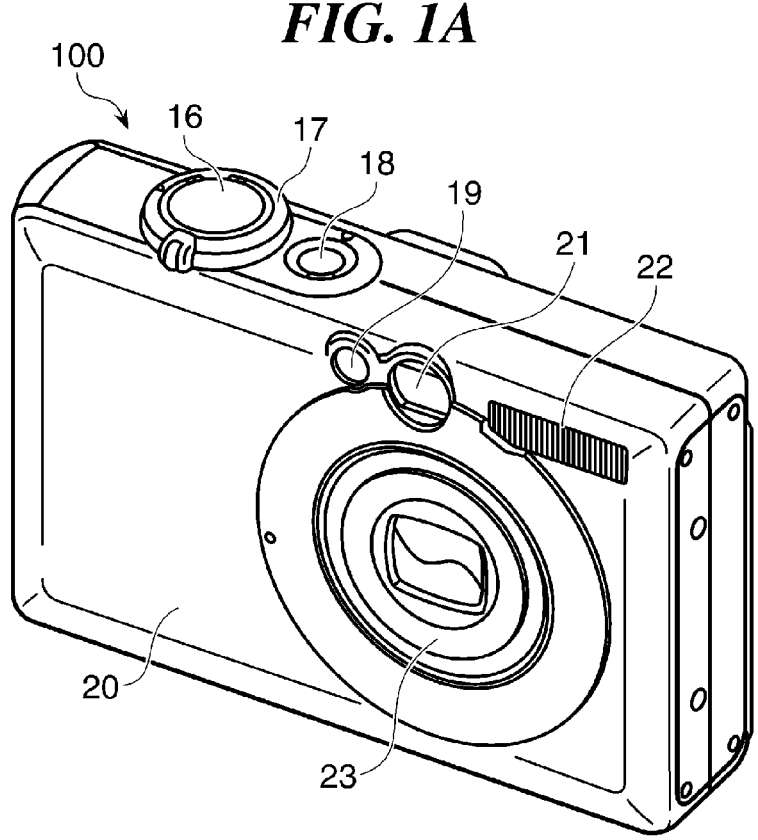
FIGS. 1A and 1B are a front perspective view and a rear view, respectively, showing a digital camera according to an embodiment of the present invention.
Figure 1B:
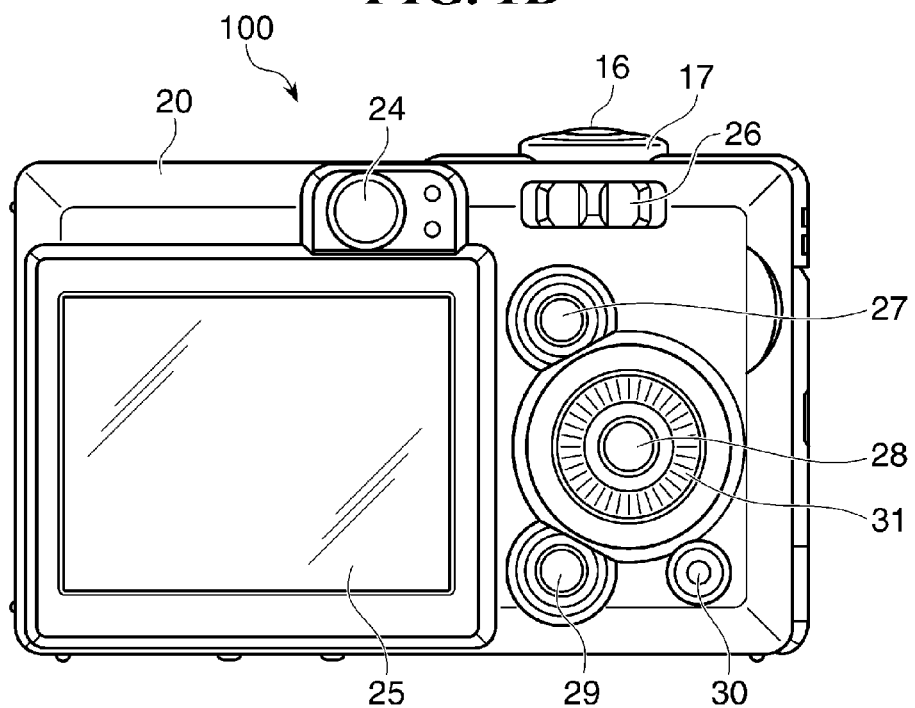

FIG. 1A is a front perspective view showing a digital camera 100 according to an embodiment of the present invention, and FIG. 1B is a rear view showing the digital camera 100. A finder object lens 21 that determines a composition of a subject, a fill light irradiation unit 19 that irradiates a subject with fill light when performing photometric measurement and distance measurement, an electronic flash 22 that illuminates a subject and emits a flash of light, and a lens barrel 23 are disposed on a front surface of a body 20 of the digital camera 100. As will be described later, the lens barrel 23 has a zooming function of changing shooting magnification.

A release button 16, a zoom switch 17, and a power switch button 18 are disposed on an upper surface of the body 20. Various operation buttons 26, 27, 28, 29, 30, and 31 are disposed on a rear surface of the body 20, and various functions can be selected by operating these buttons. Further, a finder eyepiece 24, and a display 25 such as a liquid crystal display or an organic EL display that displays a subject being shot and a taken image are disposed on the rear surface of the body 20. It should be noted that a function setting menu for the digital camera 100 and others are displayed on the display 25.

Figure 2:
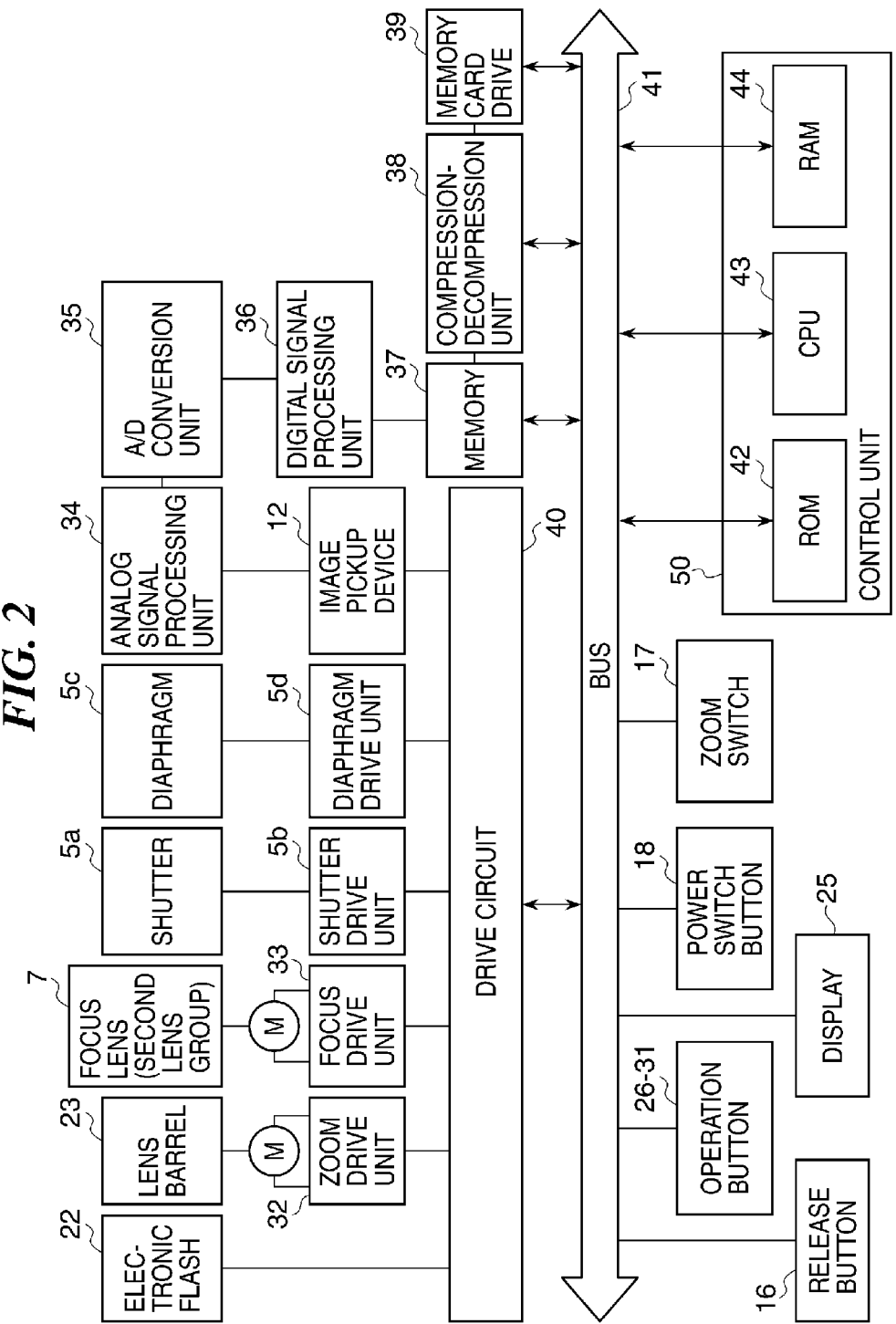
FIG. 2 is a block diagram showing the digital camera appearing in FIG. 1.

FIG. 2 is a block diagram showing the digital camera 100. A control unit 50 that controls the overall operation of the digital camera 100 has a CPU 43, a ROM 42, and a RAM 44. Programs and data for operating and controlling blocks constituting the digital camera 100 are stored in the ROM 42, and the CPU 43 reads out necessary programs, expands them in a work area of the RAM 44, and executes them. Thus, operation control of various mechanical elements in the digital camera 100 and information processing are carried out. Data required for various programs is stored in the RAM 44, and also, data and others generated when the CPU 43 performs computations are held in the RAM 44.

The control unit 50 is connected to the release button 16, the zoom switch 17, the power switch button 18, the operation buttons 26 to 31, and the display 25 via a bus 41. A memory 37, a compression-decompression unit 38, a memory card drive 39, and a drive circuit 40 are connected to the bus 41.

A zoom drive unit 32, a focus drive unit 33, a shutter drive unit 5b, a diaphragm drive unit 5d, an image pickup device 12, and the electronic flash 22 are connected to the drive circuit 40. Operation of the electronic flash 22 is directly controlled by the drive circuit 40 in accordance with control signals from the control unit 50. The zoom drive unit 32, the focus drive unit 33, the shutter drive unit 5b, and the diaphragm drive unit 5d control operation of the lens barrel 23, a focus lens 7 (second lens group) 7, a shutter 5a, and a diaphragm 5c, respectively, in accordance with control signals from the control unit 50.

The image pickup device 12 is a solid-state photoelectric conversion element such as a CCD or a CMOS. Electric charge read from the image pickup device 12 are processed into a predetermined analog signal by an analog signal processing unit 34, then converted into a digital signal by an A/D conversion unit 35, and output to a digital signal processing unit 36. The digital signal processing unit 36 subjects the digital signal to predetermined image processing to create digital data and stores the created digital data in the memory 37.

Image data stored in the memory 37 and image data stored in the memory card drive 39 are subjected to compression-decompression processing by the compression-decompression unit 38, and processed image data is displayed on the display 25 via the bus 41. As a result, a user can review an image on the display 25 and perform operations such as deletion and processing on an image by operating predetermined operation buttons as the need arises.

Figure 3:
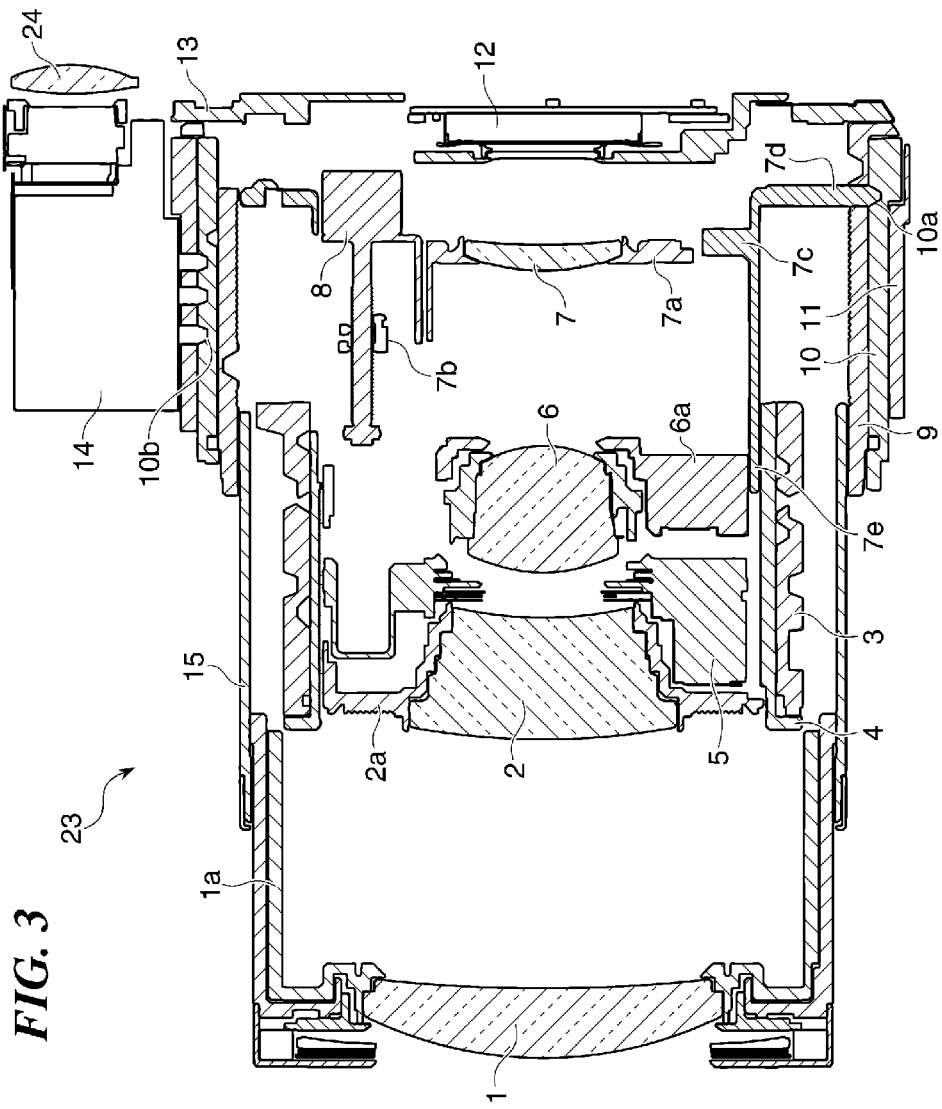
FIG. 3 is a cross-sectional view showing a state in which a lens barrel which the digital camera appearing in FIG. 1 has is extended (projected).
Figure 4:
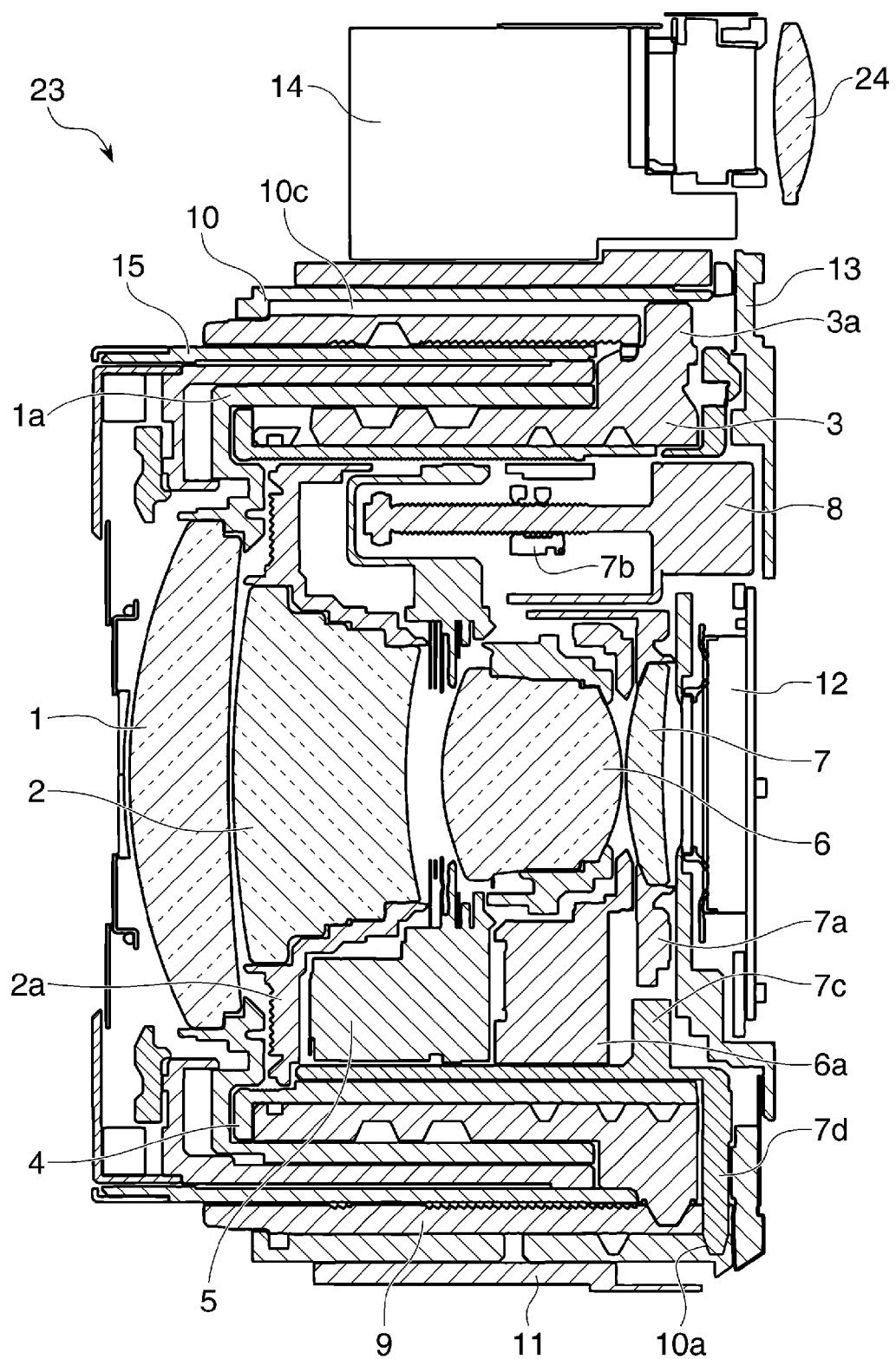
FIG. 4 is a cross-sectional view showing a state in which the lens barrel appearing in FIG. 3 contracts (retracts).

FIG. 3 is a cross-sectional view showing a state in which the lens barrel 23 is extended (projected), and FIG. 4 is a cross-sectional view showing a state in which the lens barrel 23 contracts (retracts). In the lens barrel 23, a first lens group 1 is held by a first lens group holding unit 1a. A third lens group 2 is disposed behind the first lens group 1 (on the image pickup device 12 side in a direction of an optical axis), and the third lens group 2 is held by a third lens group holding unit 2a. A diaphragm shutter unit 5 having the shutter 5a and the diaphragm 5c is disposed behind the third lens group 2, and a fourth lens group 6 is disposed behind the diaphragm shutter unit 5. The fourth lens group 6 is held by a fourth lens group holding unit 6a.

A moving cam ring 3 is disposed on an outer periphery of the third lens group holding unit 2a and the fourth lens group holding unit 6a. The third lens group holding unit 2a, the diaphragm shutter unit 5, and the fourth lens group holding unit 6a can be engaged with and follow cam grooves provided on an inner periphery of the moving cam ring 3. A rectilinear unit 4 is also provided on the inner periphery of the moving cam ring 3, and the rectilinear unit 4 and the moving cam ring 3 are joined together in a so-called bayonet manner to move substantially integrally with each other in the direction of the optical axis and rotate relatively to each other. A long groove extending in the direction of the optical axis is provided in the rectilinear unit 4, and rotation of the third lens group holding unit 2a, the diaphragm shutter unit 5, and the fourth lens group holding unit 6a is restrained to rotate by this long groove, so that they can move rectilinearly in the direction of the optical axis.

A cam groove is also provided on an outer periphery of the moving cam ring 3, and the first lens group holding unit 1a disposed on the outer periphery of the moving cam ring 3 is engaged with and follows this cam groove. On the other hand, the first lens group holding unit 1a is caused to move rectilinearly in the direction of the optical axis by the rectilinear unit 4. Thus, rotation of the moving cam ring 3 causes the first lens group holding unit 1a, the third lens group holding unit 2a, the diaphragm shutter unit 5, and the fourth lens group holding unit 6a that follow the moving cam ring 3 to move in the direction of the optical axis while being controlled to rectilinearly move. A decorative ring 15 is provided on an outer periphery of the first lens group holding unit 1a, and the decorative ring 15 moves integrally with the moving cam ring 3.

A fixed cam ring 9 is disposed on the outer periphery of the moving cam ring 3, a drive ring 10 is disposed on an outer periphery of the fixed cam ring 9, and a cover unit 11 is disposed on an outer periphery of the drive ring 10. A cam groove is formed on an inner periphery of the fixed cam ring 9, and the moving cam ring 3 is engaged with this cam groove. The moving cam ring 3 is provided with a moving cam ring to-be-followed portion 3a. A moving cam ring drive portion 10c, which is a linear counterbored groove, is provided on an inner periphery of the drive ring 10, and the moving cam ring drive portion 10c is slidably fitted in the moving cam ring to-be-followed portion 3a. The drive ring 10 being rotated by the zoom drive unit 32 causes the moving cam ring 3 to engage with the cam groove formed on the inner periphery of the fixed cam ring 9 and rectilinearly move in the direction of the optical axis while following the cam groove. An image pickup device holding unit 13 that holds the image pickup device 12 is disposed behind the fixed cam ring 9.

A finder unit 14 is provided in an upper part of the lens barrel 23. The finder unit 14 is comprised of the finder object lens 21, the finder eyepiece 24, and a finder lens group, not shown. A finder driving cam groove 10b, which is provided on the outer periphery of the drive ring 10, enables the finder lens group to move in the direction of the optical axis in response to rotation of the drive ring 10.

Figure 5:
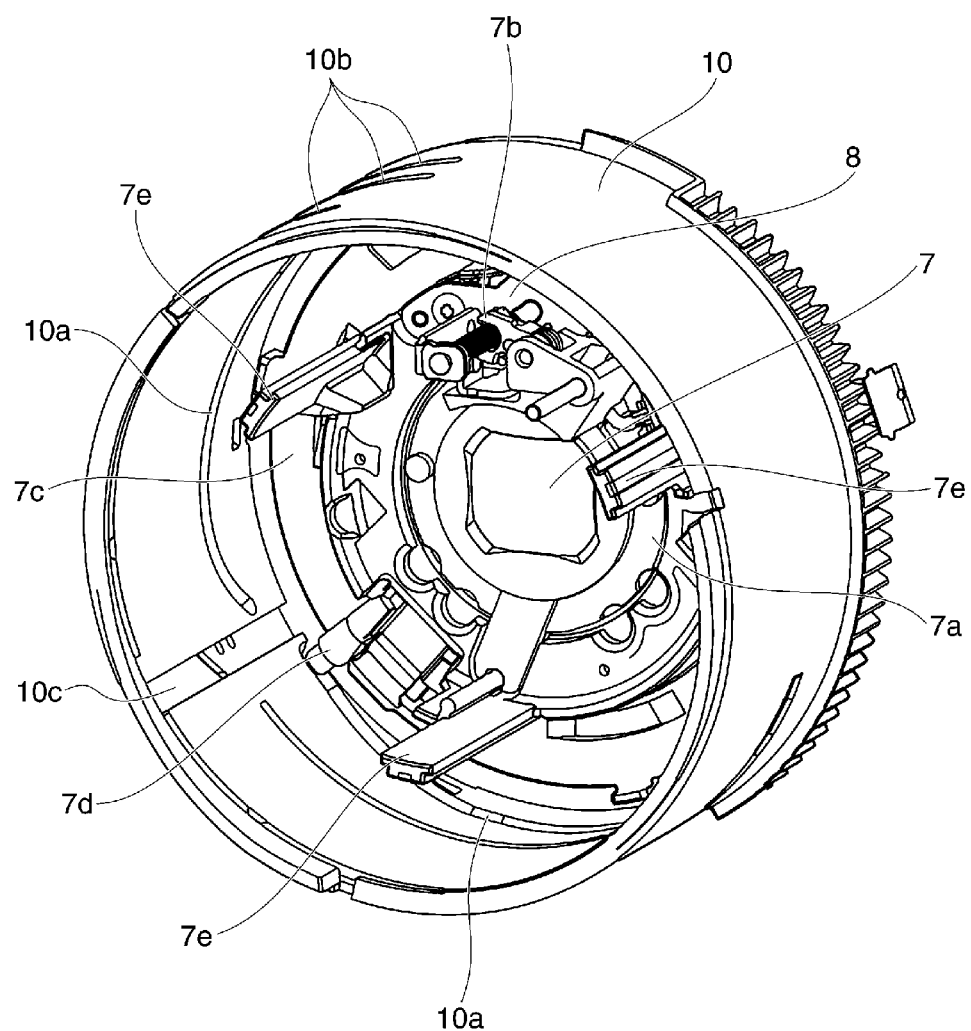
FIG. 5 is a perspective view schematically showing a structure of a drive ring which the lens barrel appearing in FIGS. 3 and 4 has.
Figure 6:
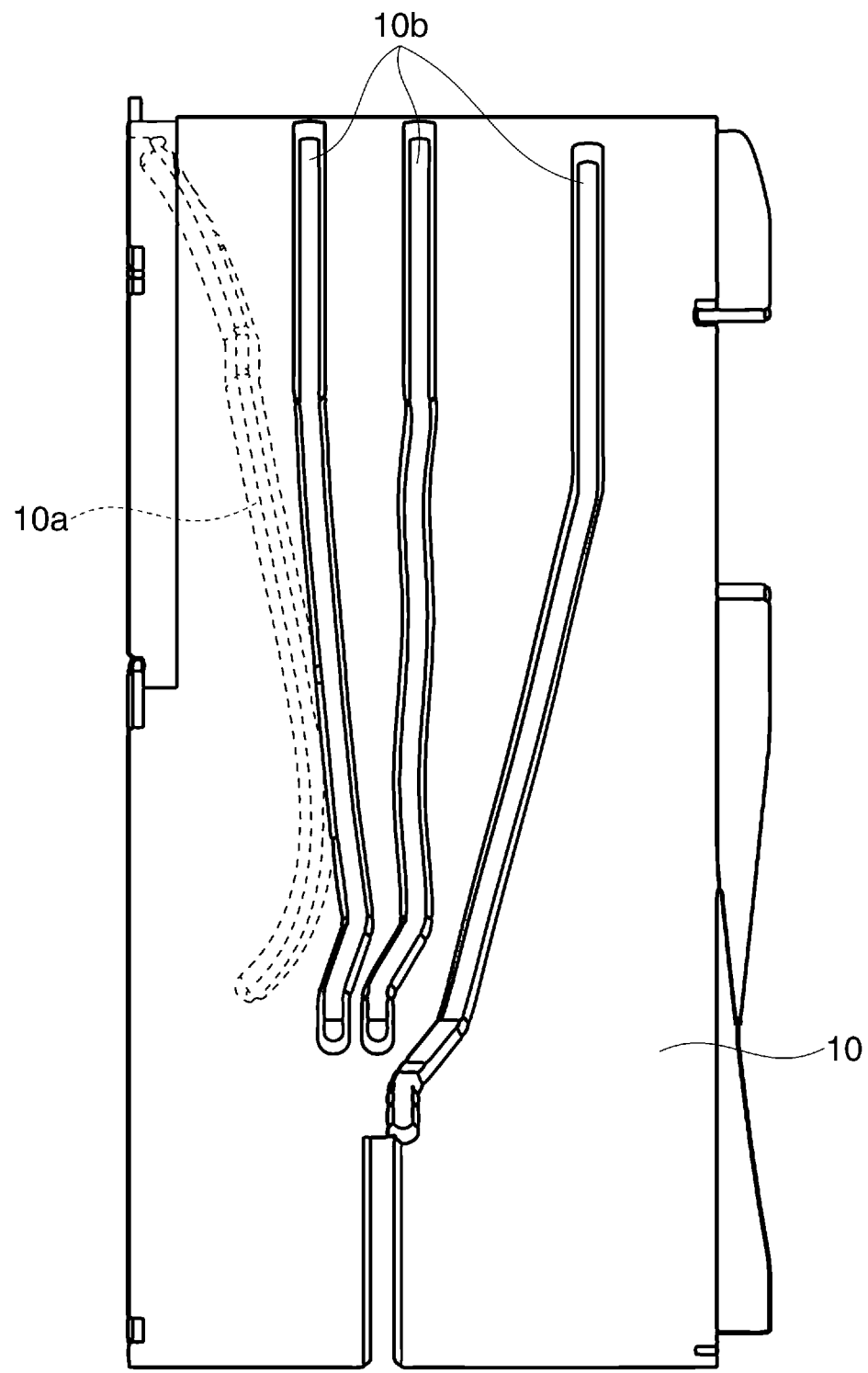
FIG. 6 is a side view showing the structure of the drive ring appearing in FIG. 5.
Figure 7:
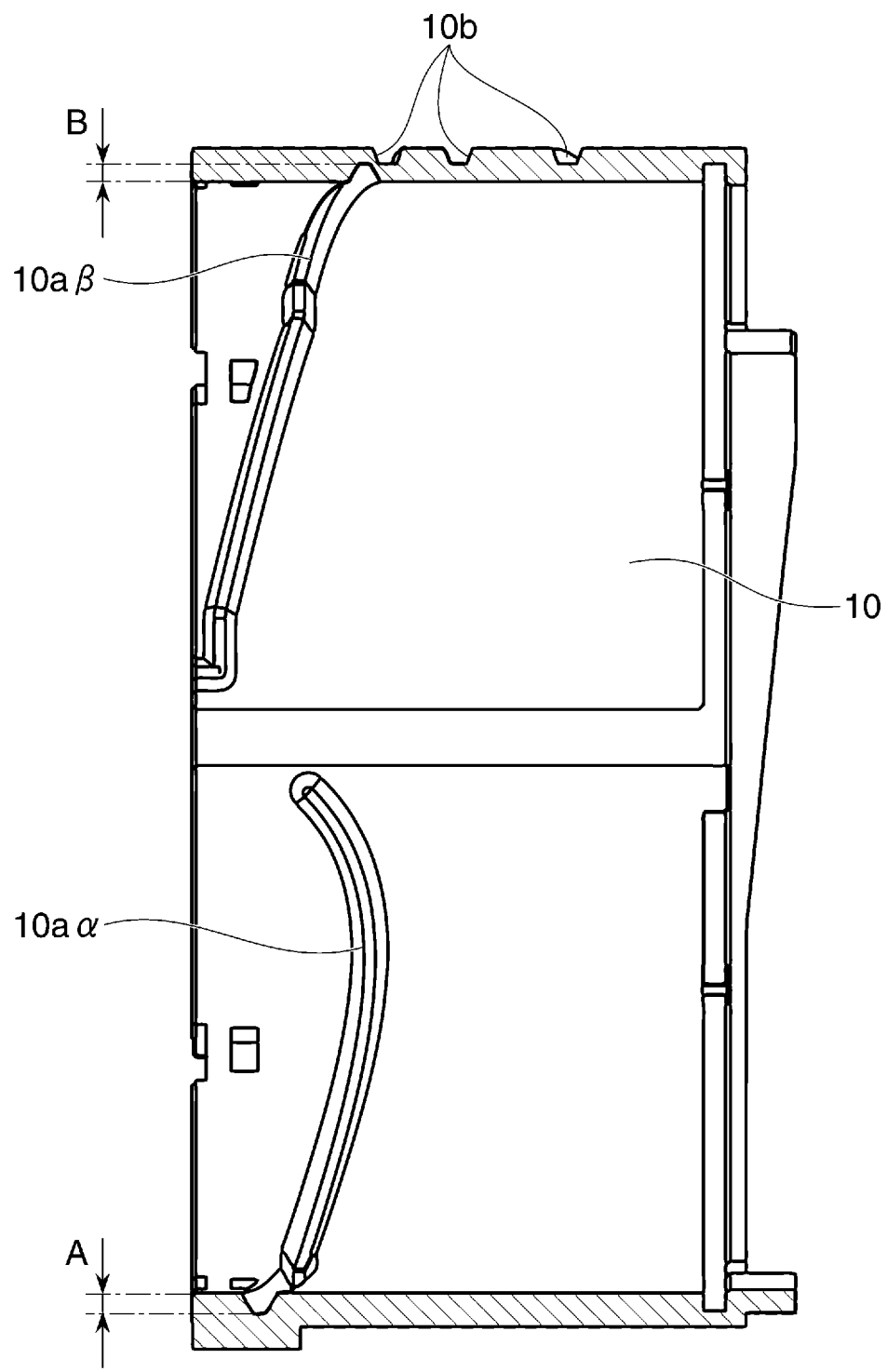
FIG. 7 is a first cross-sectional view showing the structure of the drive ring appearing in FIG. 5.
Figure 8:
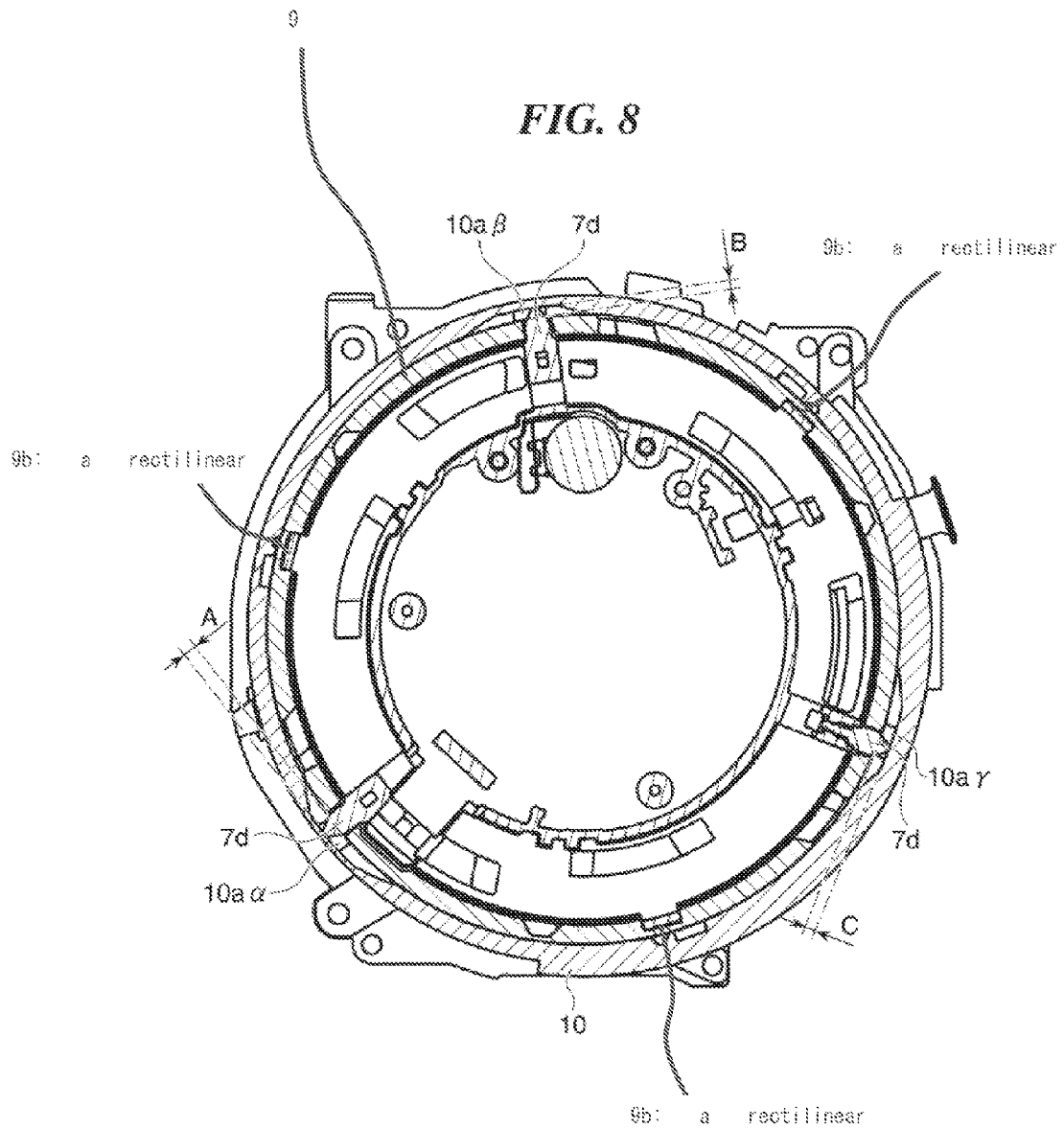
FIG. 8 is a second cross-sectional view showing the structure of the drive ring appearing in FIG. 5.

Referring now to FIGS. 3 to 8, a description will be given of an arrangement of the drive ring 10 and its vicinity in the lens barrel 23. FIG. 5 is a perspective view schematically showing a structure of the drive ring 10. FIG. 6 is a side view showing the structure of the drive ring 10. FIG. 7 is a cross-sectional view showing the structure of the drive ring 10 and is useful in explaining the depth of a focus cam groove 10*a* formed in the drive ring 10. FIG. 8 is a cross-sectional view showing an arrangement of the drive ring 10 and shows the relationship between the depth of the focus cam groove 10*a* formed in the drive ring 10 and the length of followers 7*d* provided in a focus group holding unit 7*c*.

The second lens group 7 is disposed behind the fourth lens group holding unit 6*a* (on the image pickup device 12 side) in the direction of the optical axis. The second lens group 7 is held by a second lens group holding unit 7*a*, and a nut portion 7*b* is provided in the second lens group holding unit 7*a*. The focus group holding unit 7*c* is disposed around the second lens group 7, and a focus lens drive unit 8 is provided in the focus group holding unit 7*c*. The second lens group 7 is configured to be moved in the direction of the optical axis by the nut portion 7*b* being engaged with and following the focus lens drive unit 8. Namely, the second lens group 7 acts as a focus lens.

The followers 7*d* are disposed in a radial pattern at three locations in the focus group holding unit 7*c* (see FIG. 8), and the focus cam groove 10*a* is provided on the inner periphery of the drive ring 10. The followers 7*d* being engaged with and following the focus cam groove 10*a* enable the entire focus group holding unit 7*c* to move in the direction of the optical axis. A rectilinear groove is provided on the inner periphery of the fixed cam ring 9, and this rectilinear groove restricts rotation of the focus group holding unit 7*c*. Thus, the focus group holding unit 7*c* moves rectilinearly in the direction of the optical axis without rotating.

The focus group holding unit 7*c* is provided with a rectilinear guide 7*e*, which holds the rectilinear unit 4. Namely, the focus group holding unit 7*c* is guided by the fixed cam ring 9 to move rectilinearly, and the rectilinear unit 4 is guided by the focus group holding unit 7*c* to move rectilinearly. Also, the first lens group holding unit 1*a*, the third lens group holding unit 2*a*, the diaphragm shutter unit 5, and the fourth lens group holding unit 6*a* are guided by the rectilinear unit 4 to move rectilinearly.

According to the arrangement described above, the entire focus mechanism that drives the second lens group 7 acting as a focus lens moves forward in the direction of the optical axis (toward a subject). At this time, the entire focus mechanism can be moved by the focus lens drive unit 8, and hence longer strokes can be secured.

The number of cam grooves provided on the inner periphery of the moving cam ring 3 is limited by the size of the moving cam ring 3, and hence there is a limit to miniaturization. On the other hand, providing the driving ring 10 as well with moving cam grooves for moving lens groups in the direction of the optical axis as in the present embodiment makes it possible to drive a larger number of lens groups.

Specifically, as described earlier, the focus cam groove 10*a* which the focus group holding unit 7*c* is to follow is provided on the inner periphery of the drive ring 10, and the finder driving cam groove 10*b* for driving the finder lens group is provided on the outer periphery of the drive ring 10. Therefore, rotation of the drive ring 10 causes the finder lens group as well to move in the direction of the optical axis, thus changing the zooming magnification of the finder unit 14.

As is apparent from FIG. 7, according to the present embodiment, the focus cam groove 10*a* and the finder driving cam groove 10*b* are configured to never overlap each other in the direction of the optical axis. Thus, each cam groove can be formed deep, and the followers that follow the respective cam grooves while being engaged with them can be prevented from dropping off due to a shock or the like.

It should be noted that the arrangement described above may be replaced with an arrangement in which the focus cam groove 10*a* formed on the inner periphery of the drive ring 10 and the finder driving cam groove 10*b* formed on the outer periphery of the drive ring 10 are configured to overlap each other so as to secure long strokes of the respective cam grooves. The limitation to the size of the lens barrel 23 in a radial direction is less strict than the limitation to the size of the length of the lens barrel 23 in the direction of the optical axis. Thus, to make cam grooves deep so as to increase shock resistance, the thickness of the drive ring 10 in a radial direction should be increased. In this case, in order to prevent the followers 7*d* provided in the focus group holding unit 7*c* from dropping off the focus cam groove 10*a*, it is preferred that they are configured to be engaged together as deeply as possible.

Specifically, when the respective depths of the focus cam groove 10*a* and the finder driving cam groove 10*b* are to be changed, it is preferred areas that can be deep are deepened to the extent possible. For example, as shown in FIGS. 7 and 8, a cam groove depth A of the groove portion 10*a*α, a cam groove depth B of the groove portion 10*a*β, and a cam groove depth C of the groove portion 10*a*γ, which are parts of the focus cam groove 10*a*, are determined so as to satisfy the relationship "A>B>C". Namely, cam grooves should be deep in areas of an outer periphery where no cam grooves are formed. Among the followers 7*d* provided at three locations, one engaged with a deep groove portion should be long, and one engaged with a shallow groove portion should be short in accordance with the depths of the groove portions 10*a*α, 10*a*β, and 10*a*γ, so that the depths of engagement are varied. As a result, the followers 7*d* can be effectively prevented from dropping off the focus cam groove 10*a*.

As described above, according to the present embodiment, because a number of lens groups can be moved with long strokes without bringing about an increase in the size of the lens barrel 23, zooming magnification can be increased. Moreover, according to the present embodiment, shock resistance can be improved with ease by appropriately designing the depths of cam grooves.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-150294 filed Jul. 4, 2012, which is hereby incorporated by reference herein in its entirety.

What is claimed is:

1. A lens barrel comprising:
a first cam ring configured to have a first cam groove and a rectilinear groove formed on an inner periphery;
a drive ring configured to have a second cam groove on an inner periphery and be disposed on an outer periphery of said first cam ring;
a second cam ring configured to be disposed on the inner periphery of said first cam ring and caused to follow the first cam groove and move in a direction of an optical axis by rotation of said drive ring;
a first lens group configured to be caused to move in the direction of the optical axis by rotation of said second cam ring following rotation of said drive ring;
a second lens group configured to be disposed on an image surface side of said first lens group; and
a holding unit configured to have a follower, which is to engage with the second cam groove, and hold said second lens group,
wherein rotation of said drive ring causes the follower to follow the second cam groove while being guided to move rectilinearly by the rectilinear groove in the direction of the optical axis,
the follower following the second cam groove causes said holding unit to move in the direction of the optical axis, and
said drive ring does not move in the direction of the optical axis,
said second cam ring is provided with a rectilinear unit in an inner periphery thereof,
the rectilinear unit moves in the direction of the optical axis integrally with said second cam ring and is rotatable relatively to said second cam ring, and
the rectilinear unit restricts rotation of said first lens group and rectilinearly moves by a rectilinear guide of said holding unit.

2. The lens barrel according to claim 1, further comprising a drive unit configured to move said holding unit in the direction of the optical axis,
wherein after said holding unit and said drive unit are moved in the direction of the optical axis by rotating said drive ring, said drive unit is capable of moving said holding unit in the direction of the optical axis.

3. The lens barrel according to claim 1, wherein:
a third cam groove is formed on an outer periphery of said drive ring;
a plurality of second cam grooves are formed at different positions in a circumferential direction on the inner periphery of said drive ring;
a plurality of followers are provided so as to engage with respective ones of the plurality of second cam grooves;
among the plurality of second cam grooves, a first depth of a second cam groove formed at such a position as to overlap the third cam groove in a radial direction of said drive ring is smaller than a second depth of a second cam groove that is not formed at such a position as to overlap the third cam groove in the radial direction of said drive ring; and
among the plurality of followers, a length of a follower that engages with the second cam groove having the second depth is greater than a length of a follower that engages with the second cam groove having the first depth.

4. An image pickup apparatus comprising:
an image pickup device; and
a lens barrel comprising a first cam ring that has a first cam groove and a rectilinear groove formed on an inner periphery, a drive ring that has a second cam groove on an inner periphery and is disposed on an outer periphery of the first cam ring, a second cam ring that is disposed on the inner periphery of the first cam ring and is caused to follow the first cam groove and move in a direction of an optical axis by rotation of the drive ring, a first lens group that is caused to move in the direction of the optical axis by rotation of the second cam ring following rotation of the drive ring, a second lens group that is disposed on an image surface side of the first lens group, and a holding unit that has a follower, which is to engage with the second cam groove, and holds the second lens group, wherein rotation of the drive ring causes the follower to follow the second cam groove while being guided to move rectilinearly by the rectilinear groove in the direction of the optical axis, and the follower following the second cam groove causes the holding unit to move in the direction of the optical axis,
wherein
said drive ring does not move in the direction of the optical axis,
said second cam ring is provided with a rectilinear unit in an inner periphery thereof,
the rectilinear unit moves in the direction of the optical axis integrally with said second cam ring and is rotatable relatively to said second cam ring, and
the rectilinear unit restricts rotation of said first lens group and rectilinearly moves by a rectilinear guide of said holding unit.

* * * * *